United States Patent
Grochowski

(10) Patent No.: US 6,802,769 B2
(45) Date of Patent: Oct. 12, 2004

(54) AIR DELIVERY UNIT, HOSE AND DEPLOYING DEVICE THEREFOR

(76) Inventor: Gary L. Grochowski, 1730 E. Alex Bell Rd., Centerville, OH (US) 45459

( * ) Notice: Subject to any disclaimer, the term of this patent is extended or adjusted under 35 U.S.C. 154(b) by 0 days.

(21) Appl. No.: 10/328,356

(22) Filed: Dec. 21, 2002

(65) Prior Publication Data

US 2004/0121718 A1 Jun. 24, 2004

(51) Int. Cl.$^7$ ................................................. B60H 1/00
(52) U.S. Cl. .................... 454/119; 454/48; 454/338; 138/118; 138/119
(58) Field of Search .................... 454/48, 119, 338; 138/118, 119, 133, 134, 153, 172, 97, 98

(56) References Cited

U.S. PATENT DOCUMENTS

| | | | |
|---|---|---|---|
| 4,068,478 A | | 1/1978 | Meyers et al. |
| 4,133,347 A | * | 1/1979 | Mercer ........................ 137/240 |
| 4,289,346 A | * | 9/1981 | Bourgeois ................... 296/105 |
| 4,615,501 A | | 10/1986 | Pezold |
| 4,662,268 A | * | 5/1987 | Beavers ....................... 454/338 |
| 4,713,858 A | | 12/1987 | Kelber |
| 5,023,959 A | * | 6/1991 | Mercer ............................ 4/321 |
| 5,152,636 A | | 10/1992 | Myers |
| 5,740,582 A | | 4/1998 | Harrelson, II |
| 6,000,745 A | * | 12/1999 | Alexa ..................... 296/100.12 |
| 6,210,270 B1 | * | 4/2001 | Niksic et al. ................ 454/338 |
| 6,443,830 B1 | * | 9/2002 | Vandamme ................... 454/76 |
| 6,516,836 B2 | * | 2/2003 | Fields .......................... 141/65 |

FOREIGN PATENT DOCUMENTS

FR 2610660 A1 * 8/1988

* cited by examiner

Primary Examiner—Jiping Lu
(74) Attorney, Agent, or Firm—R. William Graham

(57) ABSTRACT

An expanding and retractably collapsing device includes a generally cylindrical hose which is expandable and retractably collapsible and has formed on a surface thereof a circumferentially extending rib. A roller assembly having rotatable framework is disposed adjacent the hose and has roller bearings disposed in the framework for mechanically engaging the rib such that rotation of the framework in one or another direction causes either expanding or collapsing the hose. The roller assembly is generally axially stationary with respect to an axis about which the hose expands and contracts. An air supply unit is connected to the hose to deliver conditioned air. A remote controller enables operation of the air supply unit and includes a detector for detecting toxic air conditions and generating an alert signal indicating an unsuitable environmental condition.

25 Claims, 7 Drawing Sheets

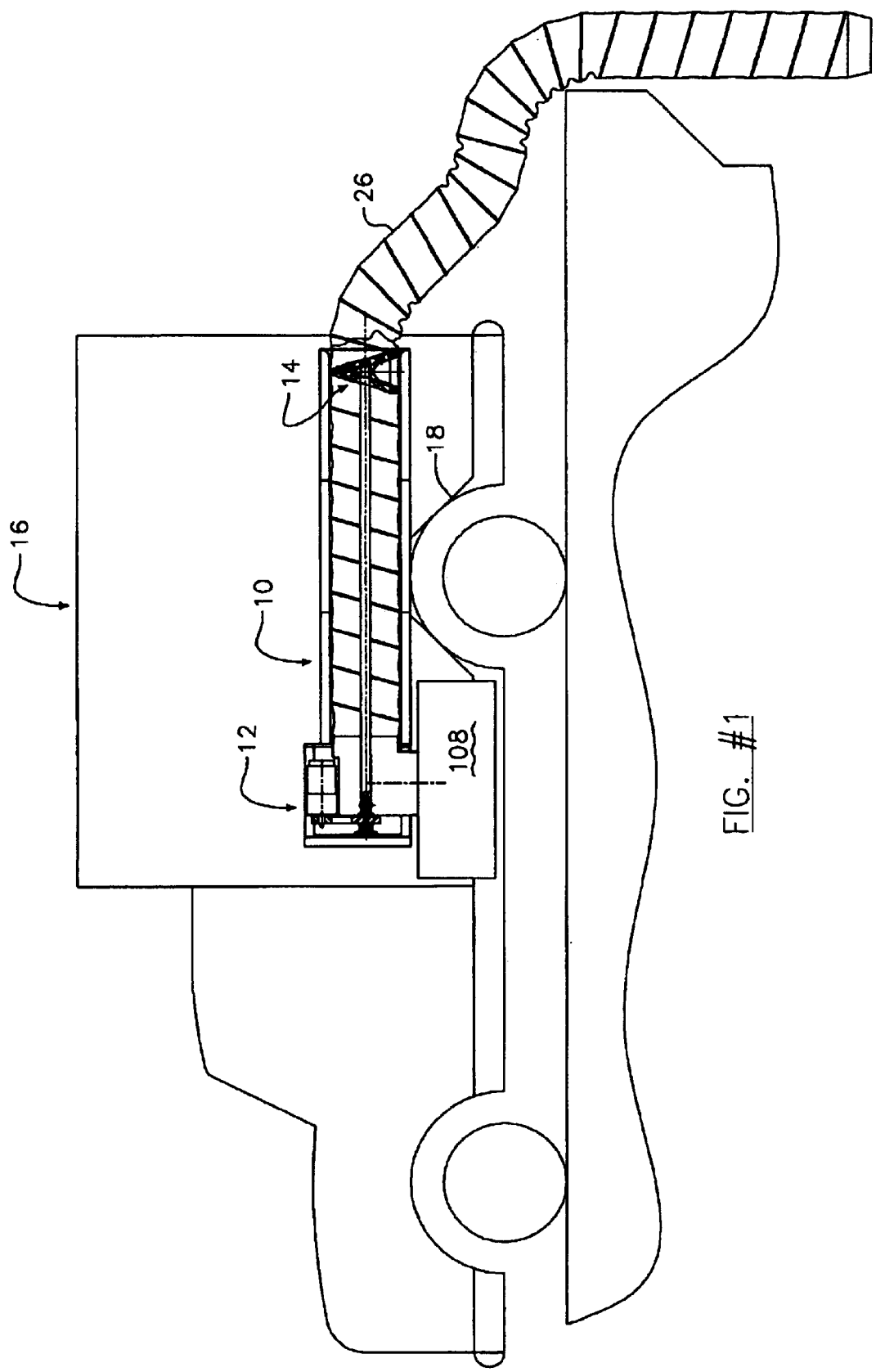
FIG. #1

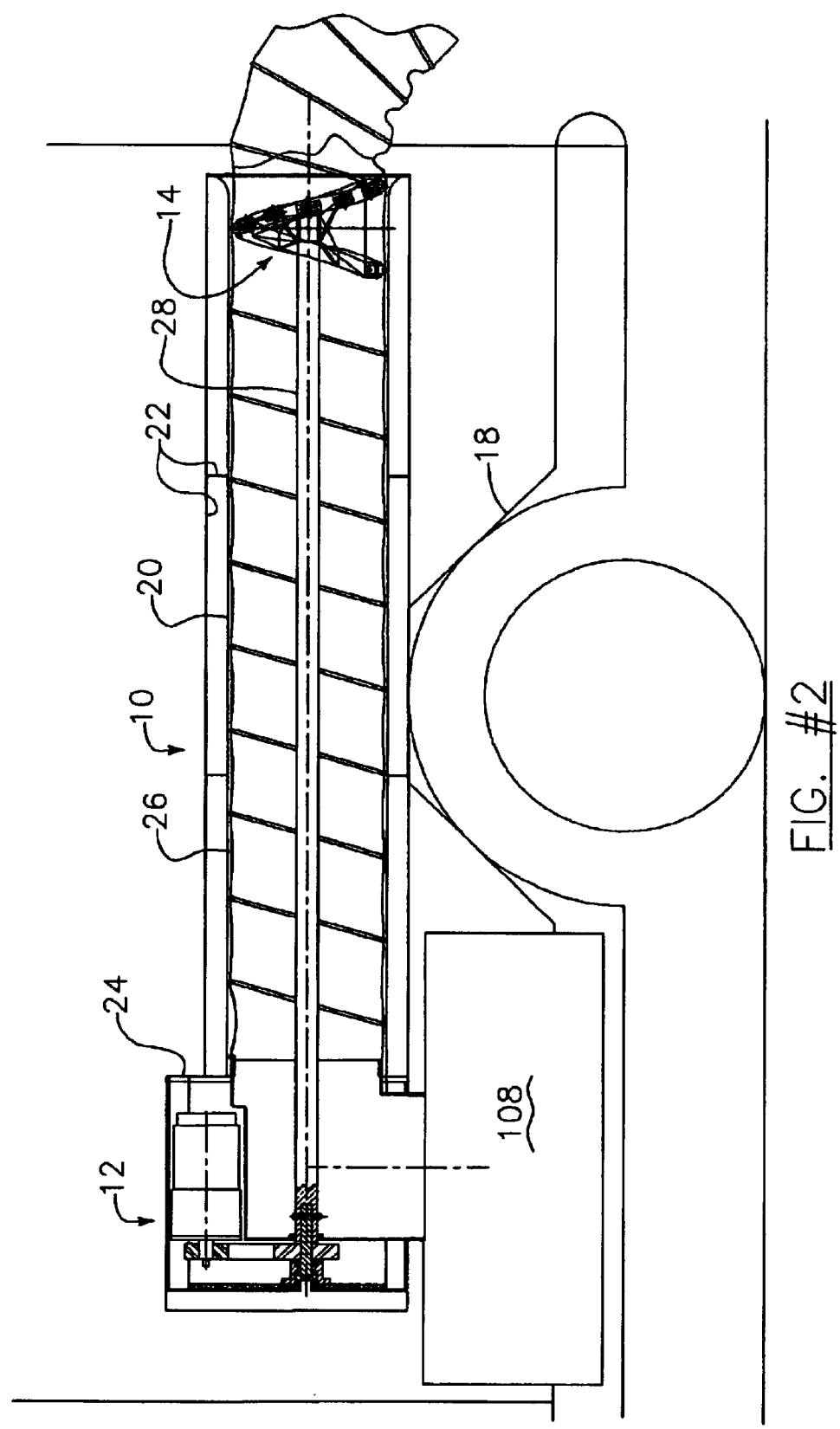
FIG. #2

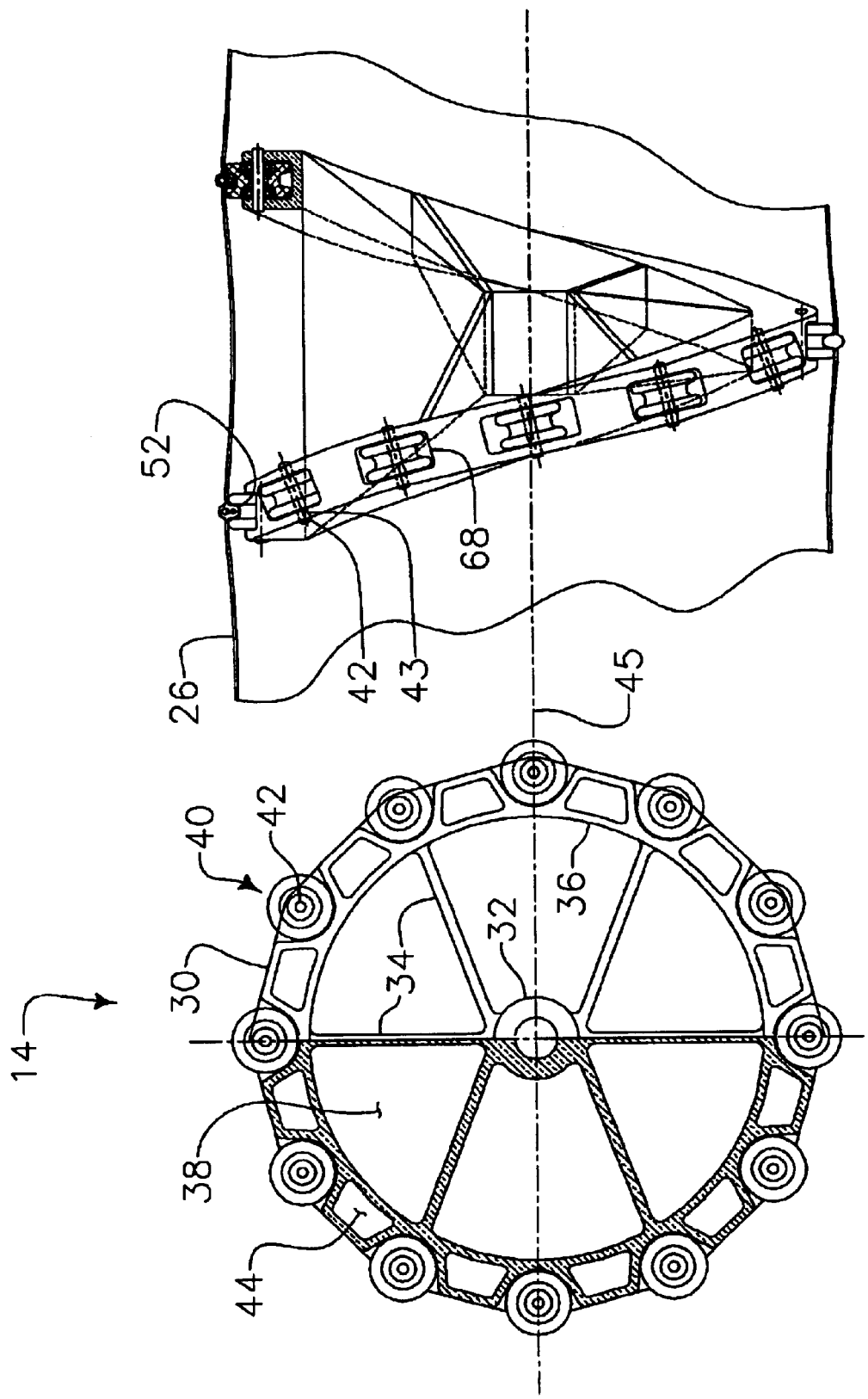
FIG. #3a
FIG. #3b

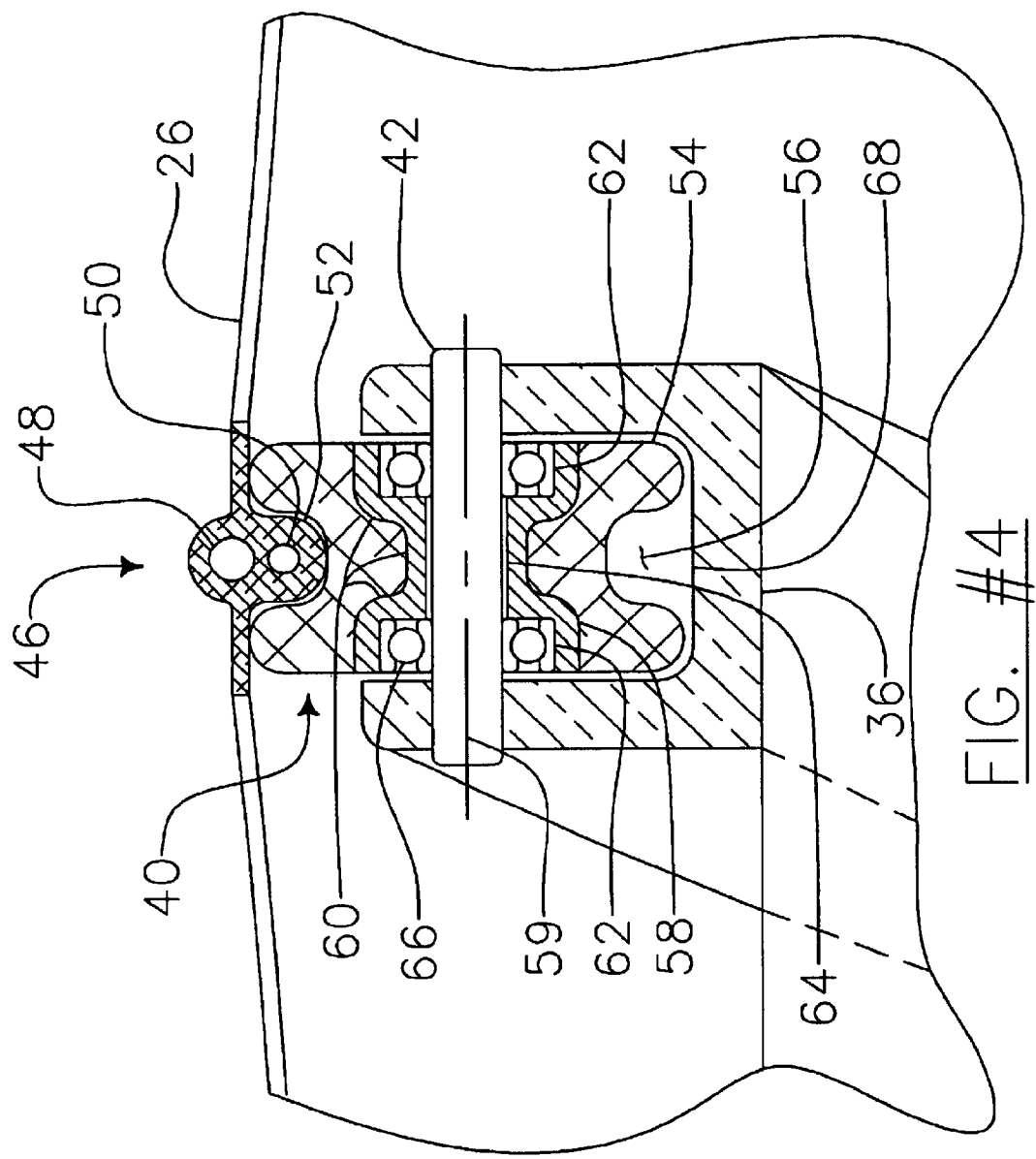
FIG. #4

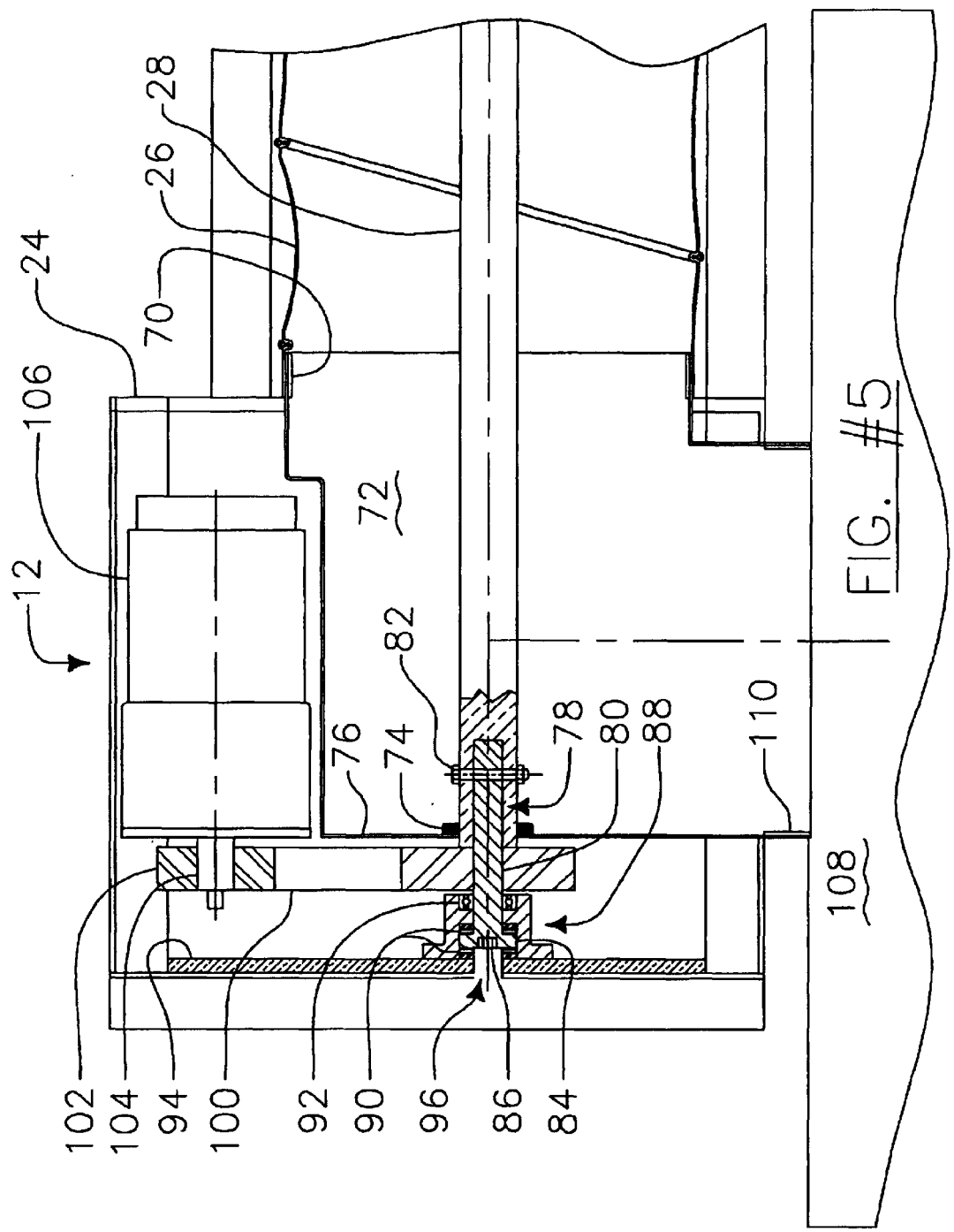
FIG. #5

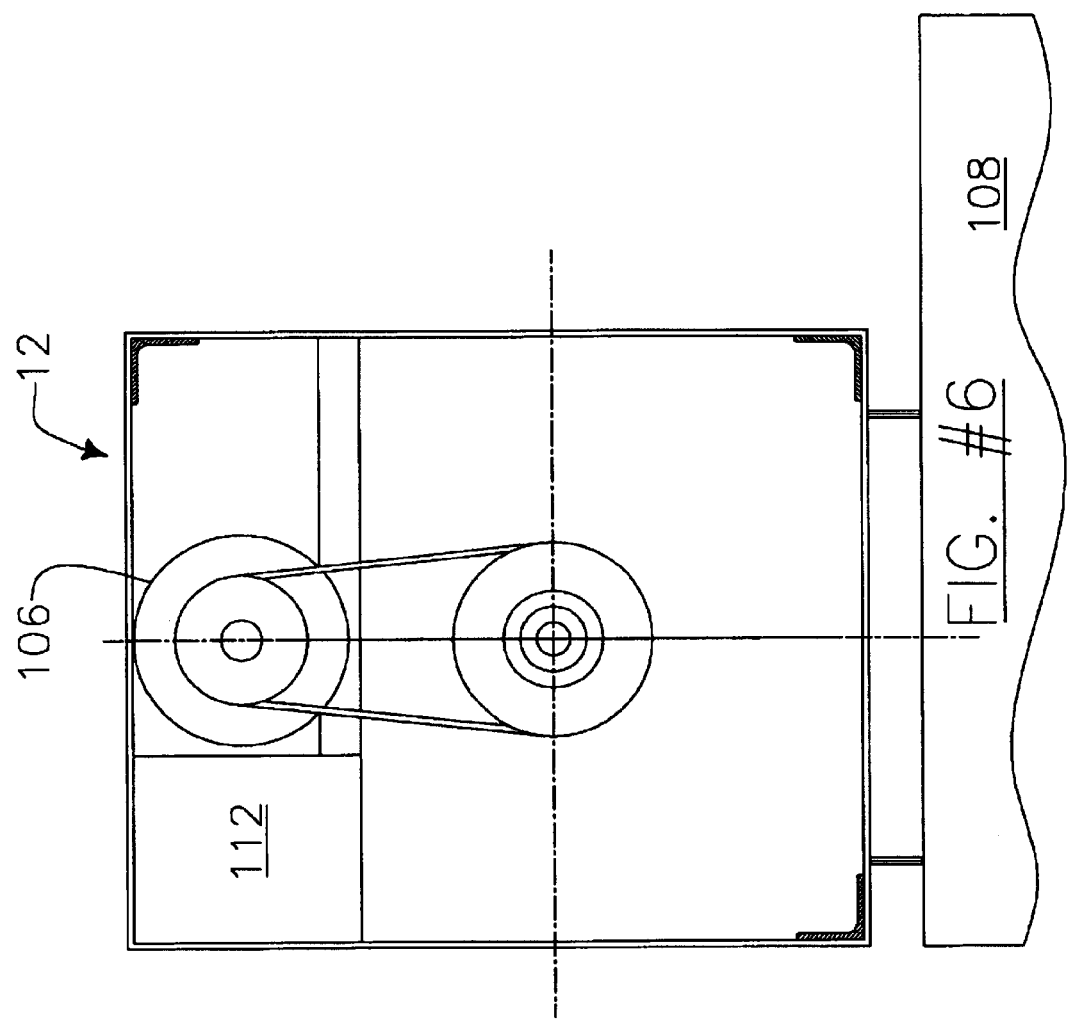

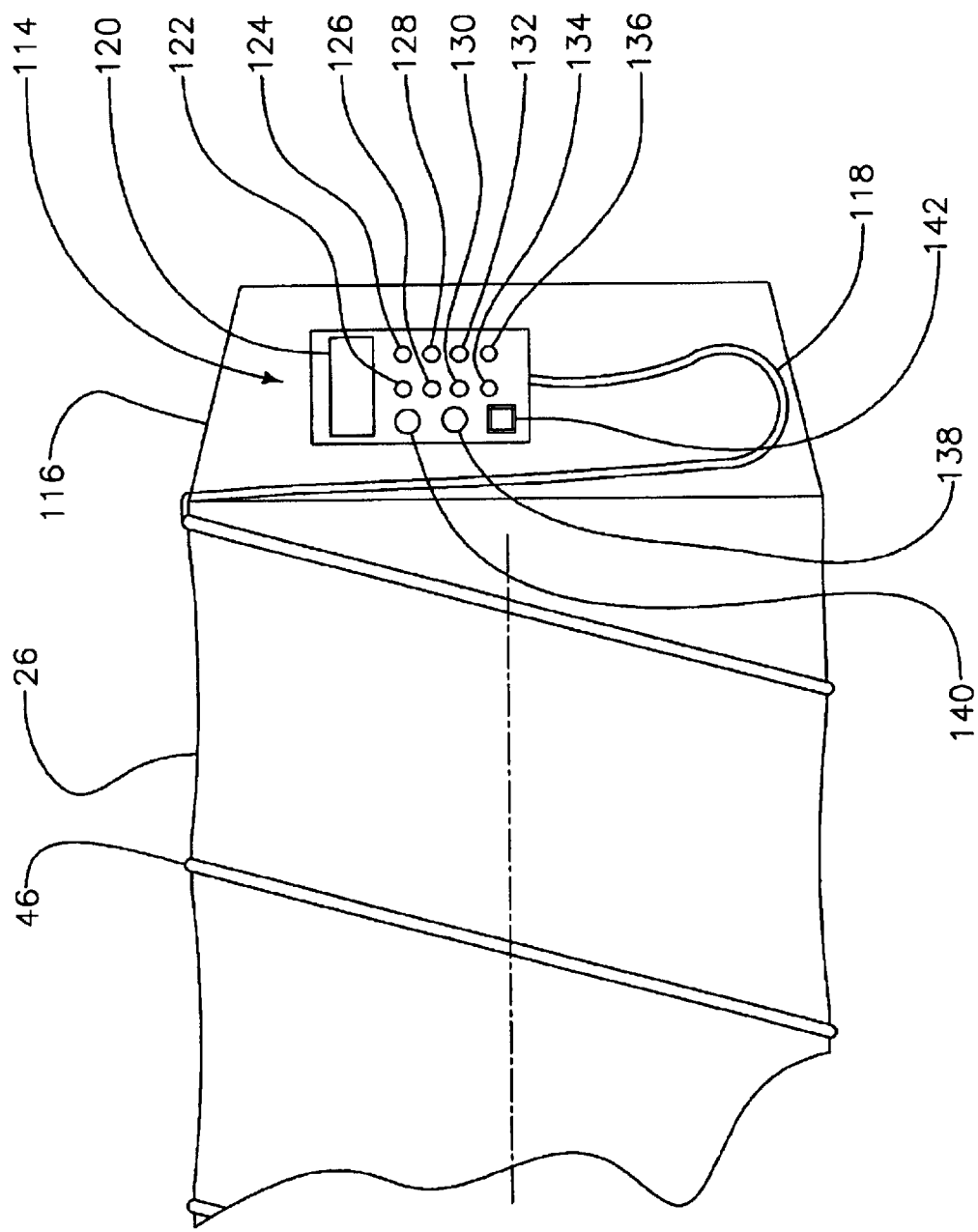
FIG. #7

AIR DELIVERY UNIT, HOSE AND DEPLOYING DEVICE THEREFOR

BACKGROUND OF THE INVENTION

1. Field of the Invention

The present invention relates to flexible air ducts. More particularly, the invention relates to storage device for a flexible air duct, such as flexible hose, which incorporates a resilient helical support member and a device for deploying the same.

2. Related Art

Work sites with enclosed environments having unsuitable air to breath, such as sewers, are entered periodically for various service reasons. These environments require some type of air ventilation system for those working in the enclosure. Without some type of external air ventilation, working conditions would be unsuitable or require the use of respirators. Current ventilation systems include an air pump outside the enclosure which is attached to flexible duct leading into the enclosure.

Deploying the expandable air duct for use is generally performed by pulling on the duct to assume an expanded position. However, when partially disposed in a sewer, the duct can be difficult to expand to a desired length as the collapsed portion remains in a place out of reach of the worker performing service in the sewer.

After use, the flexible duct is collapsed into the storage device. Some storage devices automatically retract or return the duct to a stored configuration after use. A problem with the retraction or return of the expanding duct to the storage device is that such ducts do not want to collapse.

Booms exist to aid in this regard wherein the air ducts are slid off and onto the boom via pushing or pulling the duct into an expanded or stored collapsed position. Mechanical attempts to perform these functions have thus far not met with wide acceptance. Accordingly, there remains a need to improve the art of air duct delivery and storage.

SUMMARY OF THE INVENTION

It is an object to improve air duct delivery and storage.

It is another object to improve expanding and collapsing of an air duct.

It is still another object to reduce manual set-up and tear down time at the work site.

A further object is to reduce physical requirements to set-up and tear down the work site.

Yet another object is to improve overall environmental quality at the work site.

It is another object to provide remote operator control of the air unit enabling the technician to make changes in air temperature and volume without leaving the work site.

Still another object is to provide a worker with remote operability of an air delivery system.

Another object is to warn of unsuitable or toxic environmental air conditions.

Accordingly, the present invention is directed to an expanding and retractably collapsing device for a generally cylindrical hose which is expandable and retractably collapsible and has formed on a surface thereof a circumferentially extending rib. The device includes a roller assembly having rotatable framework disposed adjacent the hose and roller bearings disposed in the framework for mechanically engaging the rib such that rotation of the framework in one or another direction causes either expanding or collapsing the hose. The rib is formed in a general helical manner on the hose and the framework is helical and configured to operatively align to a portion of the rib. The roller assembly is generally axially stationary with respect to an axis about which the hose expands and contracts.

A tube is provided for receiving and storing the hose. A drive mechanism rotates the roller assembly and is operated by a controller which can be associated with the hose.

An air delivery unit is thus provided having the hose, roller assembly, and an air supply unit operably connected to the hose to deliver air therethrough. A controller enables operation of the air supply unit which is equipped to deliver conditioned air. Further, the controller includes a detector for detecting toxic air conditions and generating an alert signal indicating an unsuitable environmental condition.

The present invention thus provides an HVAC delivery module which is a self-storage, conditioned air supply system primarily used in the underground service industries. The module provides an electronic PLC to interface for use with an existing HVAC system in a utility support vehicle or with a self contained HVAC unit already integrated in with the delivery module. The module also has an automated hose extension/retraction device, a (smart type) flexible air delivery hose, and an operator control pennant for remote operation. Through the operator pennant control, the system will monitor for toxic gas concentrations (i.e. carbon monoxide & methane gasses), provide a warning of high concentrations, and immediately increase air volume to the technician work area.

Other objects and advantages will be readily apparent to those skilled in the art upon viewing the drawings and reading the detailed description hereafter.

BRIEF DESCRIPTION OF THE DRAWINGS

FIG. 1 is a perspective view of the present invention in use.

FIG. 2 is a close up of a portion of FIG. 1.

FIG. 3a is side view of a roller assembly of the present invention.

FIG. 3b is an end view of the roller assembly of FIG. 3a

FIG. 4 is a cross section of a portion of the roller assembly and hose of the present invention.

FIG. 5 depicts a power drive mechanism of the present invention.

FIG. 6 depicts an end view of the power drive mechanism.

FIG. 7 depicts a controller for use with the present invention.

DETAILED DESCRIPTION OF THE INVENTION

Referring now to the drawings, as shown in FIG. 1, the preferred embodiment of the invention includes a hose storage chamber 10 and a power drive section 12, shown in detail in FIGS. 2 and 3. The power drive section 12 can be attached to an end of hose storage chamber 10 and a helical roller assembly 14 and is and shown in detail in FIGS. 5–6. The power drive section 12 and helical roller assembly 14 are located within hose storage chamber 10 to extend and retract hose 26. The components are shown in FIG. 1 as located in utility vehicle 16 and are mounted to one side on top of wheel well 18. It is contemplated that the chamber 10 can be otherwise portably disposed on the vehicle 16.

As shown in FIG. 2, the hose storage chamber 10 can be comprised of an inner tube 20 made from either sheet metal or plastic, e.g., blow molded plastic. Inner tube 20 can be mounted in framework 22 and attached to framework 24 of power drive section 12, wherein the framework 22 and 24 can be metal or plastic. The air delivery hose 26 can be retracted into or extended from inner tube 20 via helical roller assembly 14 which can be statically located at the exit/entry end of inner tube 20 and connected to a power transmission shaft 28 which is attached to center mounting hub 32 of helical roller assembly 14.

As shown in FIGS. 3a and 3b, the helical roller assembly 14 includes a framework 30 which can be a metal, e.g., aluminum, or plastic, having a center mounting hub 32 with structural ribs 34 extending outward in a radial fashion from hub 32 and attaching to an outer framework rim 36. A plurality of relatively large openings 38 are defined between the hub, 32, ribs, 34 and rim 36 through to allow for air flow therethrough. Outer framework rim 36 includes a series of grooved roller assemblies 40. The roller assemblies 40 are operatively seated within circumferentially spaced cast recessed surfaces 68. The roller assemblies 40 are supported on shafts 42 which are configured to seat within portion 43 of the recessed surfaces 68. The roller bearing assemblies 40 are thus radially located in the form a helical spiral about a centerline 45 of framework 30.

The framework rim 36 is configured in a spiral to complementary mate with a spiral internal driver rib 52 formed on the air delivery hose 26 and allows full engagement of grooved roller assemblies 40 therewith, as shown in detail in FIG. 4. The framework rim 36 also includes a plurality of openings 44 formed between recessed surfaces 68 to allow for additional airflow through framework 30.

Referring to FIG. 4, air delivery hose 26 can be of commercially standard construction-utilizing Polyester-Vinyl laminates with expanded pitch. A vinyl wearstrip 46 is provided on the hose 26 and encapsulates a hard drawn spring steel helix wire 48 and a USB type communications cable 50. Wearstrip 46 utilizes a specially designed internal driver rib 52 to engage grooved roller assemblies 40 thus enabling retraction or extension of air delivery hose 26 in and out of storage chamber 10.

The grooved roller assembly 40 can include a nylon type molded wheel 54 with a recessed groove 56 located circumferentially about an outer diameter of molded wheel 54. The profile of groove 56 is slightly larger than the profile of internal driver rib 52 to minimize friction during operation. Wheel 54 can be molded to a steel hub 58 having a stepped profile 60 to create a mechanical interlock once wheel 54 and steel hub 58 are molded together. Steel hub 58 includes of two machined counter bores 62 each located at opposite ends of steel hub 58 along centerline axis 59. A concentric through hole 64 is also disposed in the hub 58 having a diameter slightly larger than shaft 42. Bearings 66 are pressed into each counter bore 62 to complete assembly of grooved roller assembly 40 which is located in cast recess 68 of outer housing rim 36 and supported by shaft 42

As shown in FIG. 5, air delivery hose 26 is attached to exhaust bezel 70 of power drive section 12. Power transmission shaft 28, generally made of extruded aluminum tubing, extends through air chamber 72 through air chamber seal 74 and through air chamber back wall 76. Power transmission shaft 28 is anchored via a steel stub shaft 78 consisting of a ground shaft portion 80 which fits internally to power transmission shaft 28 and is secured by bolts 82. A headed flange portion 84 of shaft 78 is encapsulated by bearing block 88 and includes a hex socket 86 includes for insertion of a crank to manually extend or retract air delivery hose 26. Bearing block 88 consists of two thrust bearings 90 one being located in front of headed flange 84 and the second thrust bearing 90 being located behind headed flange 84 to provide support to power transmission shaft 28 during extending and collapsably retracting of air delivery hose 26. Bearing block 88 also contains one radial load bearing 92 to further provide support to power transmission shaft 28. Bearing block 88 is mounted to main support plate 94 which has a clearance hole 96 to provide access to hex socket 86.

Power transmission shaft 28 is driven by gearbelt pulley 98 being attached to stub shaft 78. Gearbelt pulley 98 is engaged by gearbelt 100 which engages gearbelt pulley 102 being attached to motor shaft 104 of DC step motor 106 which is attached to framework 24 of power drive section 12. DC step motor 106 can be a variable speed, reversible DC motor operating on either 12 or 24 volt current and preferably has torque load sensing capability through the PLC control module 112 shown in FIG. 6. Pre-conditioned air is generated in existing HVAC unit 108 located in utility vehicle 16, shown in FIG. 1, and is delivered to the power drive section 12 via air inlet bezel 110

As shown in FIG. 6, with main support plate 94 removed for clarity, PLC control module 112 is located inside power drive section 12 and is electrically interfaced with HVAC unit 108, DC step motor 106. The PLC control module 112 is operably connected to and operator control pennant 114, shown in FIG. 7, via communications cable 50 located inside wearstrip 46. Operator control pennant 114 can operate as a wireless control or be attached to hose bezel 116 attached to end of air supply hose 26 and being plugged into communications cable 50 located inside wearstrip 46 via umbilical 118.

As shown in FIG. 7, operator control pennant 114 has a LED screen 120 to display system data, button 122 to extend hose 26, button 124 to retract hose 26, button 126 to turn on air supply, button 128 to turn off air supply, button 130 to increase air supply temperature, button 132 to decrease air supply temperature, button 134 to increase air volume, button 136 to decrease air volume, sensor 138 to detect methane gasses, sensor 140 to detect carbon monoxide gas, and a audible warning annunciator 142 to warn technician of high gas concentrations.

The above described embodiment is set forth by way of example and is not for the purpose of limiting the present invention. It will be readily apparent to those skilled in the art that obvious modifications, derivations and variations can be made to the embodiment without departing from the scope of the invention. Accordingly, the claims appended hereto should be read in their full scope including any such modifications, derivations and variations.

What is claimed is:

1. An expanding and retractably collapsing device for a generally cylindrical hose which is expandable and retractably collapsible and has formed on a surface thereof a circumferentially extending rib, which comprises:

a roller assembly having rotatable framework disposed adjacent the hose and roller bearings disposed in said framework for mechanically engaging the rib such that rotation of said framework causes one of expanding and collapsing the hose, wherein the rib is formed in a general helical manner on the hose and said framework is helical and configured to operatively align to a portion of the rib.

2. The expanding and retractably collapsing device of claim 1, wherein said roller assembly is generally axially stationary with respect to an axis about which said hose expands and contracts.

3. The expanding and retractably collapsing device of claim 1, which further includes a tube for receiving and storing said hose.

4. The expanding and retractably collapsing device of claim 1, which further includes a drive mechanism for rotating said roller assembly.

5. The expanding and retractably collapsing device of claim 4, which further includes a controller associated therewith to enable operation of said drive mechanism.

6. The expanding and retractably collapsing device of claim 1, which includes means for one of manually and automatically rotating said roller assembly.

7. An expanding and retractably collapsing hose device, which comprises:

a generally cylindrical hose which is expandable and retractably collapsible and has formed on a surface thereof a circumferentially extending rib; and a roller assembly having rotatable framework disposed adjacent said hose and roller bearings disposed in said framework for mechanically engaging said rib such that rotation of said framework causes one of expanding and collapsing said hose, wherein said rib is formed in a general helical manner on said hose and said framework is helical and configured to operatively align to a portion of said rib.

8. The expanding and retractably collapsing hose device of claim 7, wherein said roller assembly is generally axially stationary with respect to an axis about which said hose expands and contracts.

9. The expanding and retractably collapsing hose device of claim 7, which further includes a tube for receiving and storing said hose.

10. The expanding and retractably collapsing hose device of claim 7, which further includes a drive mechanism for rotating said roller assembly.

11. The expanding and retractably collapsing hose device of claim 7, which further includes a controller to enable operation of said drive mechanism.

12. The expending and retractably collapsing hose device of claim 11, wherein a second end of said hose has said controller operably associated therewith to enable operation of said drive mechanism.

13. The expending and retractably collapsing hose device of claim 7, which includes means for one of manually and automatically rotating said roller assembly.

14. The expanding and retractably collapsing hose device of claim 7, wherein a first end of said hose is operably connectable to an air conditioning device.

15. An air delivery unit, which includes:

a generally cylindrical hose which is expandable and retractably collapsible and has formed on a surface thereof a circumferentially extending rib;

a roller assembly having rotatable framework disposed adjacent said hose and roller bearings disposed in said framework for mechanically engaging said rib such that rotation of said framework causes one of expanding and collapsing said hose; and an air supply unit operably connected to a first end of said hose to deliver air through to a second end of said hose, wherein said rib is formed in a general helical manner on said hose and said framework is helical and configured to operatively align to a portion of said rib.

16. The air delivery unit of claim 15, wherein said roller assembly is generally axially stationary with respect to an axis about which said hose expands and contracts.

17. The air delivery unit of claim 15, which further includes a tube for receiving and storing said hose.

18. The air delivery unit of claim 15, which further includes a drive mechanism for rotating said roller assembly.

19. The air delivery unit of claim 18, which further includes a controller to enable operation of said drive mechanism.

20. The air delivery unit of claim 19, wherein said second end of said hose has said controller operably associated therewith to enable operation of said drive mechanism.

21. The air delivery unit of claim 15, which includes means for one of manually and automatically rotating said roller assembly.

22. The air delivery unit of claim 15, which further includes a controller to enable operation of said air supply unit.

23. The air delivery unit of claim 22, wherein a second end of said hose has said controller operably associated therewith to enable operation of said supply unit.

24. The air delivery unit of claim 22, wherein said controller includes means for detecting toxic air conditions and generating an alert signal indicating an unsuitable environmental condition.

25. The air delivery unit of claim 15, wherein said air supply unit is equipped to deliver conditioned air.

* * * * *